United States Patent
Yahata et al.

(10) Patent No.: US 8,538,280 B2
(45) Date of Patent: Sep. 17, 2013

(54) IMAGE ERASING APPARATUS AND IMAGE ERASING METHOD

(75) Inventors: Isao Yahata, Shizuoka-ken (JP); Ken Iguchi, Shizuoka-ken (JP); Takahiro Kawaguchi, Shizuoka-ken (JP); Hiroyuki Taguchi, Shizuoka-ken (JP); Hiroyuki Tsuchihashi, Shizuoka-ken (JP); Hiroyuki Taki, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 289 days.

(21) Appl. No.: 13/046,509

(22) Filed: Mar. 11, 2011

(65) Prior Publication Data

US 2011/0222131 A1    Sep. 15, 2011

Related U.S. Application Data (60) Provisional application No. 61/314,107, filed on Mar. 15, 2010, provisional application No. 61/314,108, filed on Mar. 15, 2010.

(51) Int. Cl.
*G03G 15/00* (2006.01)
*G03G 21/00* (2006.01)

(52) U.S. Cl.
USPC ........... 399/1; 399/16; 399/389; 399/411

(58) Field of Classification Search
USPC ........... 399/1, 16, 341, 23, 389, 390, 411; 430/97
See application file for complete search history.

(56) References Cited

U.S. PATENT DOCUMENTS

| | | | |
|---|---|---|---|
| 5,545,381 A * | 8/1996 | Iida et al. | 399/1 X |
| 6,466,764 B2 * | 10/2002 | Jacob et al. | 399/390 |
| 7,283,758 B2 * | 10/2007 | Murakami | 399/389 X |
| 8,260,188 B2 * | 9/2012 | Yahata et al. | 399/411 |
| 2009/0154970 A1 * | 6/2009 | Yoshida et al. | 399/341 |
| 2010/0315475 A1 * | 12/2010 | Taki et al. | 347/179 |
| 2011/0221851 A1 * | 9/2011 | Kawaguchi et al. | 347/179 |
| 2011/0222951 A1 * | 9/2011 | Yahata et al. | 400/645.2 |

* cited by examiner

*Primary Examiner* — Sophia S Chen (74) *Attorney, Agent, or Firm* — Patterson & Sheridan, L.L.P.

(57) ABSTRACT

An image erasing apparatus includes a scanning unit, a memory unit, an erasing unit, and a carrying unit. The scanning unit converts an image formed on a sheet into image data which is electronic data. The memory unit stores the image data converted by the scanning unit. The erasing unit erases the image formed on the sheet. The carrying unit carries the sheet to the scanning unit and the erasing unit in this order.

10 Claims, 9 Drawing Sheets

FIG. 9

# IMAGE ERASING APPARATUS AND IMAGE ERASING METHOD

CROSS-REFERENCE TO RELATED APPLICATION

This application is based upon and claims the benefit of priority from: U.S. provisional application 61/314107, filed on May 15, 2010; and U.S. provisional application 61/314108, filed on May 15, 2010; the entire contents all of which are incorporated herein by reference.

FIELD

Embodiments described herein relate generally to a technique for erasing an image on a sheet.

BACKGROUND

There is an image erasing apparatus that erases an image on a printed sheet using toner having a property of being made achromatic as heat is applied thereto at a predetermined or higher temperature.

In addition, there may be a case where after the image on the sheet is erased, information of the sheet is needed again.

DETAILED DESCRIPTION

An image erasing apparatus includes a scanning unit, a memory unit, an erasing unit, and a carrying unit. The scanning unit converts an image formed on a sheet into image data which is electronic data. The memory unit stores the image data converted by the scanning unit. The erasing unit erases the image formed on the sheet. The carrying unit carries the sheet to the scanning unit and the erasing unit in this order.

In embodiments described hereinafter, a technique for computerizing an image on a sheet before erasing the image from the sheet and storing the image in a memory unit is provided.

First Embodiment

Figure 1:
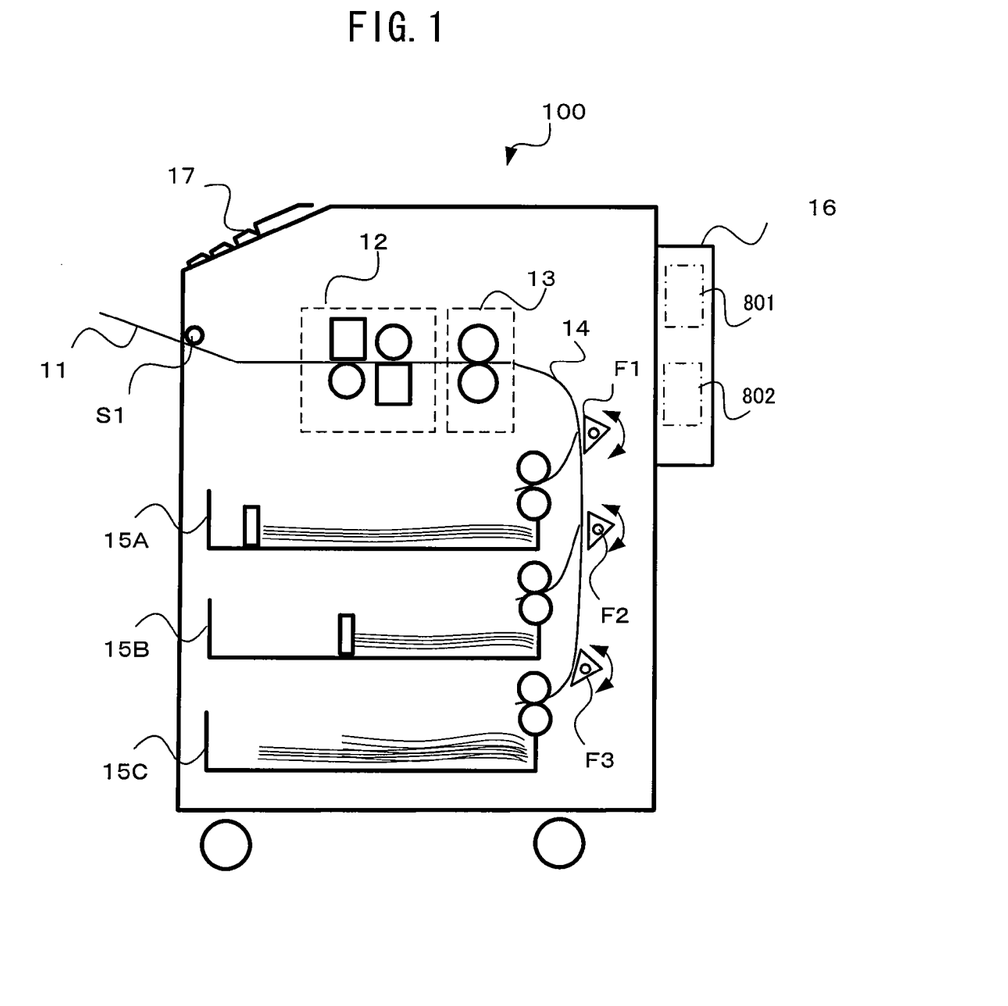
FIG. 1 is a diagram showing the configuration of an image erasing apparatus according to a first embodiment.

FIG. 1 is a schematic diagram showing the configuration of an image erasing apparatus according to a first embodiment. An image erasing apparatus 100 has a sheet insertion opening 11, a scanner device 12, a print erasing device 13, a carrying unit 14, stacking cassettes 15A to 15C, a control device 16, and a control panel 17.

The sheet insertion opening 11 is a tray on which a sheet from which an image is to be erased is provided, and includes a sensor S1 that detects whether or not a sheet is provided. The scanner device 12 has a CCD sensor and reads image information on the sheet to convert the read image information into electronic data. In addition, in the scanner device 12, two CCDs are installed on upper and lower sides of the sheet to be symmetrical so as to simultaneously scan front and rear sides of the sheet. The print erasing device 13 has heaters that apply a predetermined temperature to the sheet read by the scanner device 12 so as to achromatize toner formed on the sheet. In the print erasing device 13, two heaters are disposed to abut the front and rear sides of the carried sheet so as to heat both sides of the sheet.

The carrying unit 14 includes flappers F1 to F3, a carrying roller (not shown), and a carrying belt. The carrying unit 14 carries the sheet from the sheet insertion opening 11 to the scanner device 12 and the print erasing device 13 in this order, and carries the sheet from which the image is erased by the print erasing device 13 to the stacking cassettes 15A to 15C. The flappers F1 to F3 of the carrying unit 14 are rotated under the control of the control device 16 so as to switch a carriage pathway of the sheet. The sheets are sorted by the guidance of the flappers F1 to F3 depending on the size.

The stacking cassettes 15A to 15C are cassettes that accumulate the sheets after erasure and in the first embodiment, accommodate the sheets depending on the size. The control device 16 is a unit that controls the overall hardware of the image erasing apparatus 100 and includes a processor 801 which is an operation processing device (for example, a CPU (Central Processing Unit)), and a memory 802 configured as a volatile or a nonvolatile memory device. The processor 801 has a role of executing various processes in the image erasing apparatus 100 and also has a role of realizing various functions by executing programs stored in the memory 802. The memory 802 may be configured as, for example, a RAM (Random Access Memory), ROM (Read Only Memory), DRAM (Dynamic Random Access Memory), SRAM (Static Random Access Memory), VRAM (Video RAM), HDD (Hard Disk Drive), or the like, and has a function of storing various kinds of information and programs used for the image erasing apparatus 100. In addition, the memory 802 stores data or programs needed to be stored to be nonvolatile and stores the image of the electronic data converted by the scanner device 12. The functions realized using the processor 801 and the memory 802 may be realized by an ASIC (Application Specific Integrated Circuit).

The control panel 17 has a touch panel display or a keyboard so as to receive a designation of a parameter or instruction from a user and displays the progress of a process or a status of the devices for the user.

Figure 2:
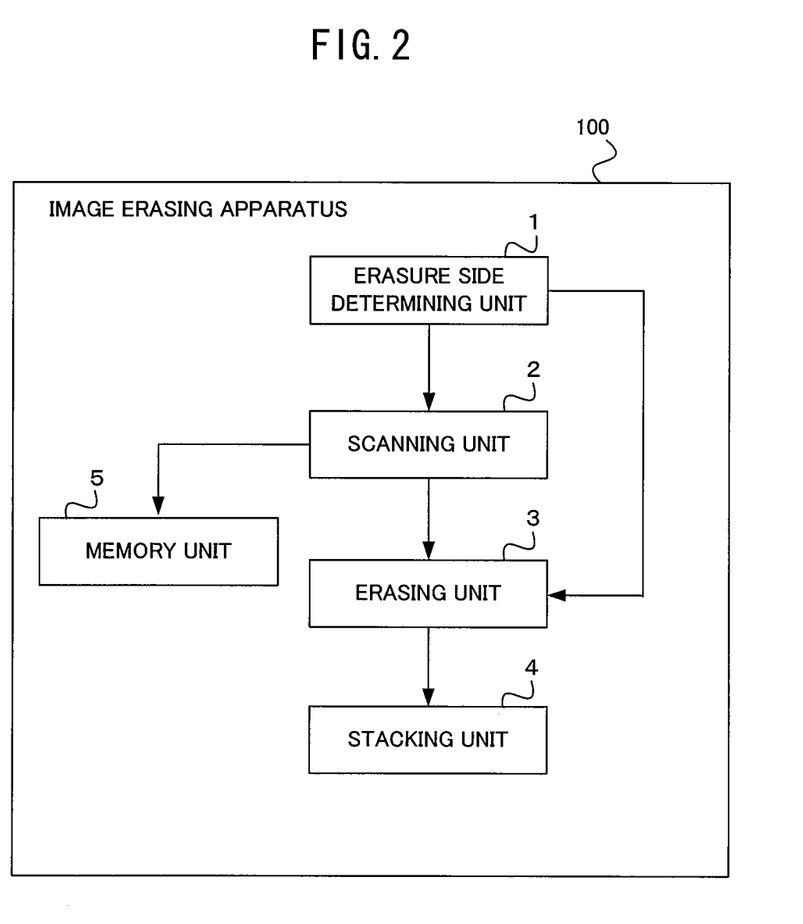
FIG. 2 is a block diagram of the image erasing apparatus according to the first embodiment.

Next, an example of a block diagram of the image erasing apparatus 100 is shown in FIG. 2. The image erasing apparatus 100 has an erasure side determining unit 1, a scanning unit 2, an erasing unit 3, a stacking unit 4, and a memory unit 5.

The erasure side determining unit 1 determines whether an image is formed on a single side or both sides, and in the case of the single side, determines whether the image is formed on a front side or a rear side. The scanning unit 2 scans the side where the image is formed on the basis of a determination result of the erasure side determining unit 1 and converts the image formed on the sheet into electronic data. The erasing unit 3 erases the image on the sheet side determined by the erasure side determining unit 1 on which the image is formed.

The stacking unit 4 accumulates the sheets from which images are erased depending on the sheet size. In addition, the sizes of the sheets are determined by the scanning unit 2 and the sheets are sorted by the carrying unit 14. The memory unit 5 stores the image data computerized by the scanning unit 2. The memory unit 5 accumulates a plurality of packets of image data according to the capacitance of a storage area.

A correspondence between the block diagram of FIG. 2 and the configuration diagram of FIG. 1 will be described. The erasure side determining unit 1 is realized by the reading function of the scanner device 12 and the control device 16. The scanning unit 2 is realized by the reading function and the function of converting an image into electronic data of the scanner device 12, and the control device 16. The erasing unit 3 is realized by the print erasing device 13 and the control device 16. The stacking unit 4 is realized by the stacking cassettes 15A to 15C. The memory unit 5 is realized by the control device 16 (the memory 802).

Although not shown in FIG. 2, carriage of the sheet to each of the blocks is managed by the carrying unit 14.

Figure 3:
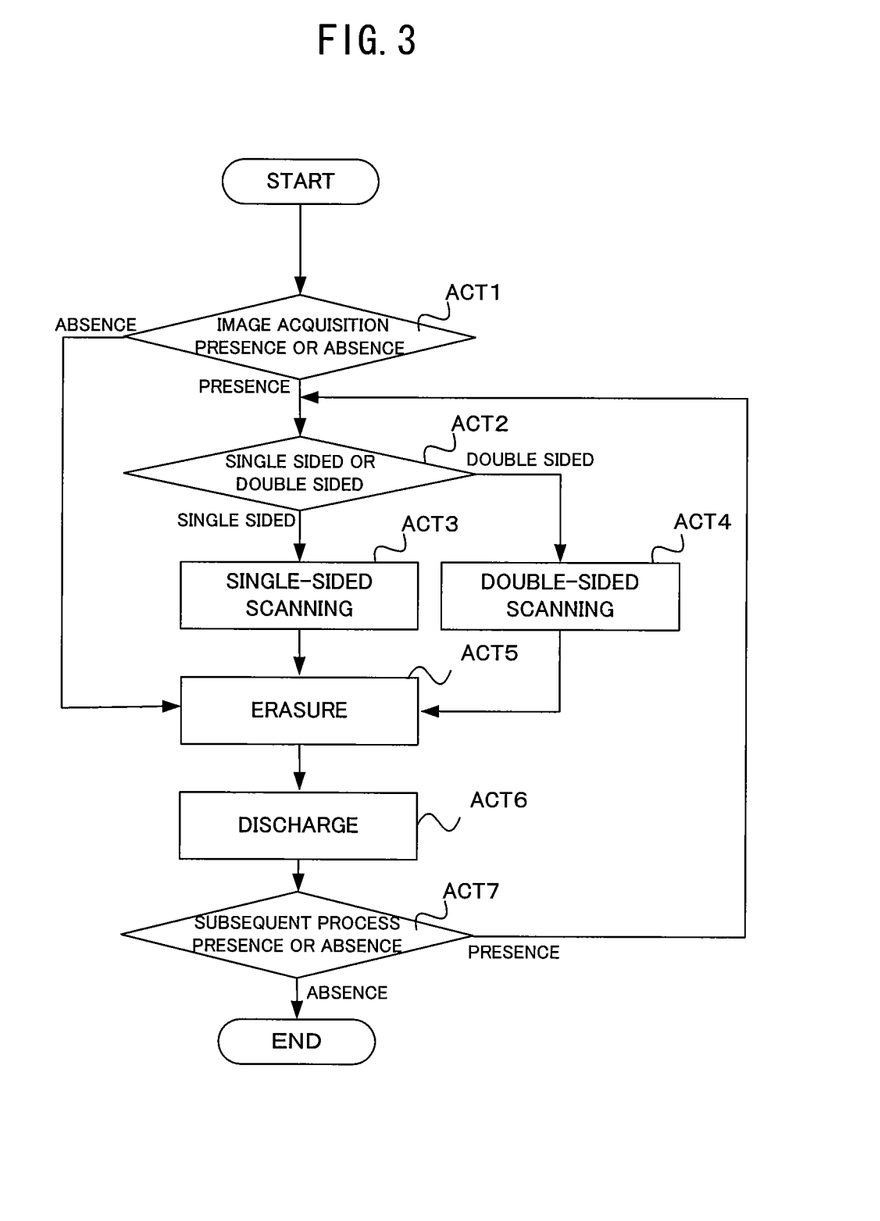
FIG. 3 is a diagram showing a flowchart of the image erasing apparatus according to the first embodiment.

Next, an operation example of the image erasing apparatus 100 will be described with reference to a flowchart of FIG. 3. First, whether or not to perform image acquisition is determined on the basis of an operation of the control panel 17 by the user (ACT 1). Here, when the image acquisition is not to be performed (ACT 1, Absence), the process proceeds to ACT 5. In this case, the carrying unit 14 carries the sheet to the print erasing apparatus 13 as it is. When the image acquisition is to be performed (ACT 1, Presence), the carrying unit 14 carries the sheet to the scanner device 12.

The erasure side determining unit 1 determines which side the image is formed on the sheet (ACT 2). The erasure side determining unit 1 scans both sides of the sheet using the scanner device 12 and determines presence or absence of an image by determining presence or absence of edges and shade.

If the image is formed on the single side (ACT 2, Single sided), the scanning unit 2 scans the side where the image is formed so as to be converted into electronic data, and stores the electronic data after the conversion in the memory unit 5 (ACT 3). When images are formed on both sides (ACT 2, Double sided), the scanning unit 2 scans the both sides so as to be converted into electronic data and stores each image in the memory unit 5 (ACT 4). In addition, the scanning unit 2 may also be mounted to store data read by the operation of the erasure side determining unit 1 in the memory unit 5.

Thereafter, the carrying unit 14 carries the sheet to the print erasing device 13. The erasing unit 3 acquires information regarding which side the image is formed from the erasure side determining unit 1, and applies heat to the sheet side where the image is formed using the heaters to erase the image (ACT 5). Thereafter, the carrying unit 14 carries the sheet from which the image is erased to the stacking unit 4 (ACT 6). In addition, when the sheet is disposed in the stacking unit 4, the control unit 16 acquires size information regarding the sheet determined by the scanning unit 2 and controls the directions of the flappers F1 to F3. Under the control, in the stacking unit 4, sheets sorted depending on the size are accumulated.

The control device 16 determines whether or not there is a sheet to be processed subsequently (ACT 7), and when there is a sheet (ACT 7, Presence), the process is returned to ACT 2. The control device 16 determines presence or absence of the subsequent sheet on the basis of whether or not a detection signal is received from the sensor S1 installed in the sheet insertion opening 11. When there is no sheet (ACT 7, Absence), the process is ended.

As such, since the image of the sheet is converted into electronic data before erasure and is stored in the memory unit, the image can be rewritten when the image data is needed after the erasure.

Second Embodiment

In the second embodiment, a configuration in which a sheet which is subjected to an erasing process by the erasing unit once is inspected again so as to determine whether or not there is a residual image will be described.

Figure 4:
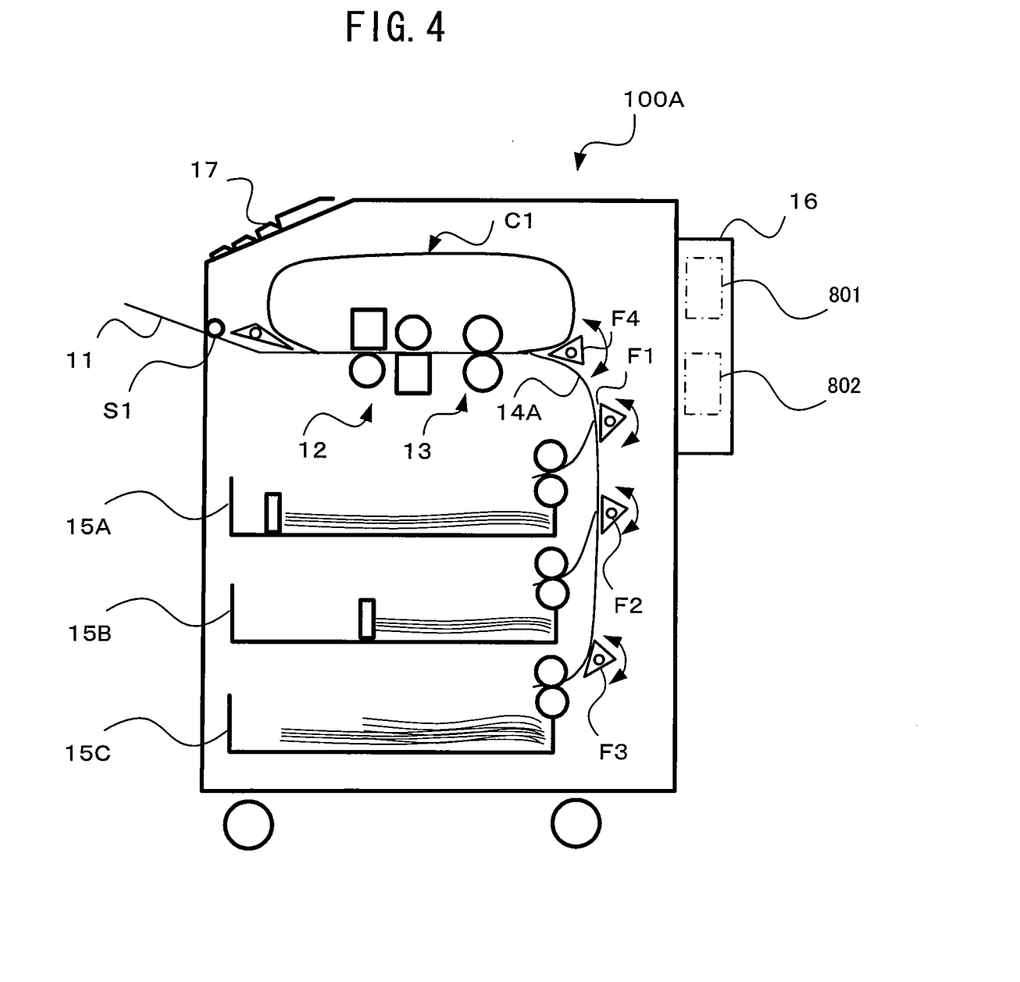
FIG. 4 is a diagram showing the configuration of an image erasing apparatus according to a second embodiment.

The configuration of an image erasing apparatus according to the second embodiment is shown in FIG. 4. A carrying unit 14A of the image erasing apparatus 100A further includes a flapper F4 in addition to the carrying unit 14 described according to the first embodiment and includes a circulation pathway C1 for carrying a sheet processed by the erasing device 13 to the scanner device 12 again.

A sheet disposed in the sheet insertion opening 11 is first carried to the scanner device 12 and the print erasing device 13 in this order by the carrying unit 14A as in the first embodiment. Thereafter, the sheet is carried in a direction of the circulation pathway C1 by switching a pathway of the flapper F4. The sheet is carried to the scanner device 12 again by the circulation pathway C1, and an inspection of a residual image is performed. The sheet on which the inspection of a residual image is finished is guided in the directions of the stacking cassettes 15A to 15C by the flapper F4.

In addition, like reference numerals the same as those of FIG. 1 denote like elements the same as those of the first embodiment, therefore detailed description will be omitted.

Figure 5:
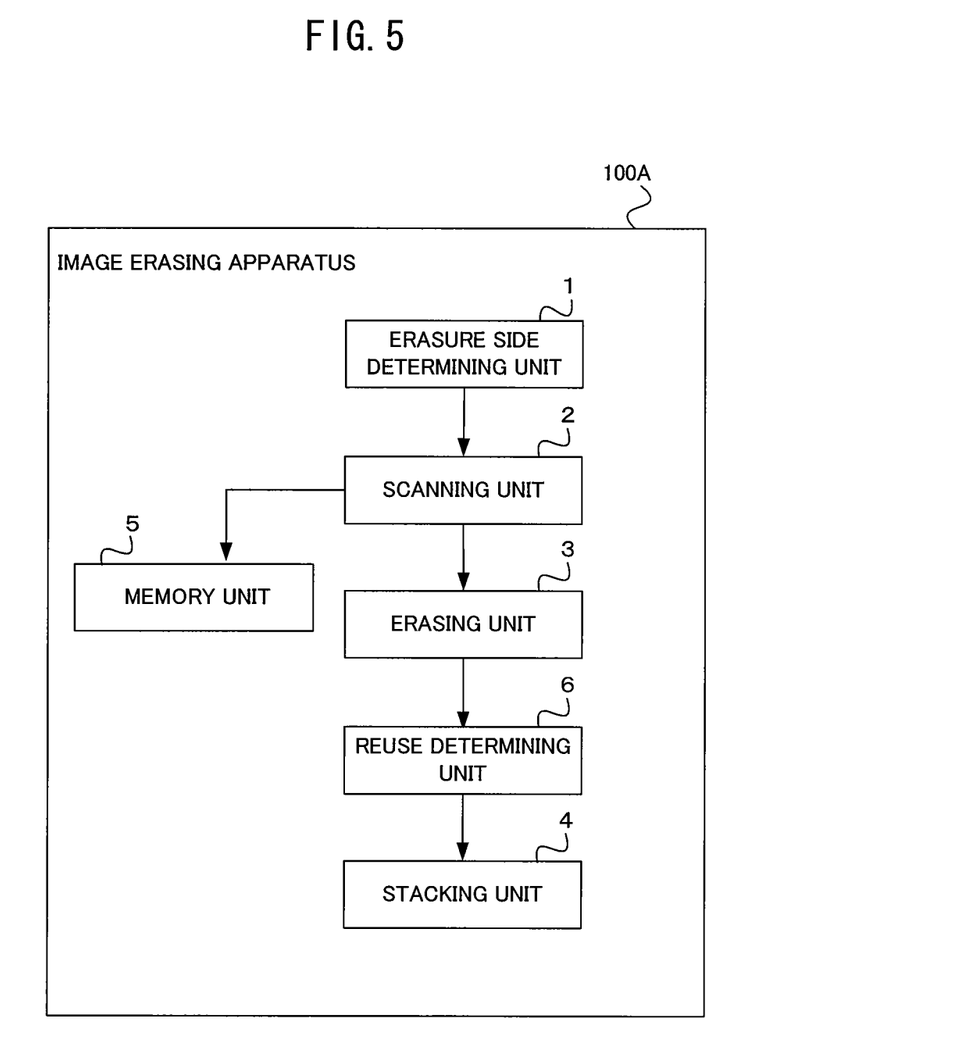
FIG. 5 is a block diagram of the image erasing apparatus according to the second embodiment.

A block diagram of the image erasing apparatus 100A is shown in FIG. 5. The image erasing apparatus 100A further includes a reuse determining unit 6 in addition to the image erasing apparatus 100 described according to the first embodiment. The reuse determining unit 6 determines whether or not there is residual toner on the sheet subjected to the erasing process. The reuse determining unit 6 scans the sheet carried again by the carrying unit 14A using the scanner device 12 and performs the edge detection process or the shade detection process described above, thereby determining presence or absence of a residual image. The reuse determining unit 6 is realized by the reading function of the scanner device 12 and the control device 16.

In addition, the carrying unit 14A carries a sheet which is determined to be non-reusable by the reuse determining unit 6 since a residual image is detected therefrom to the stacking cassette 15C, and carries a sheet which is determined to be reusable to the stacking cassettes 15A and 15B depending on the sheet size.

Figure 6:
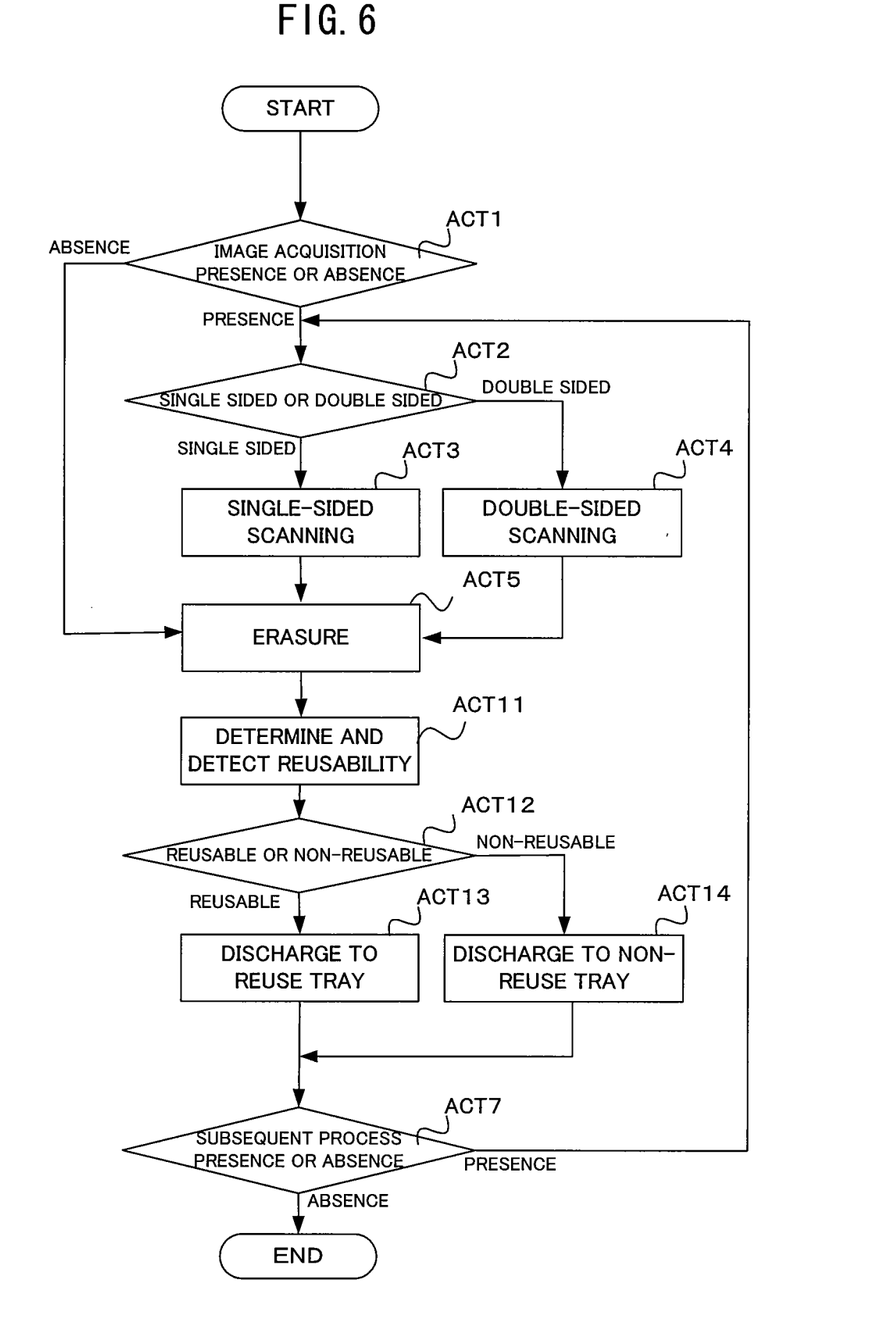
FIG. 6 is a diagram showing a flowchart of the image erasing apparatus according to the second embodiment.

Next, operations of the image erasing apparatus 100A will be described with reference to a flowchart of FIG. 6. Like reference numerals the same as those of FIG. 3 denote like elements the same as those of the first embodiment, therefore detailed description will be omitted.

After performing the erasing process in ACT 5, the carrying unit 14A carries the sheet to the scanner device 12 again using the circulation pathway C1 under the guidance of the flapper F4. Thereafter, the reuse determining unit 6 performs the edge detection process and the shade detection process by scanning the carried sheet (ACT 11) and determines presence or absence of a residual image (ACT 12). When there is no residual image (ACT 12, Reusable), the carrying unit 14A carries the sheet to the stacking cassette 15A or 15B on the basis of the guidance of the flappers F4, and F1 or F2 (ACT 13). On the other hand, when there is a residual image (ACT 12, Non-reusable), the carrying unit 4A carries the sheet to the stacking cassette 15C on the basis of the guidance of the flappers F4, and F1 to F3 (ACT 14).

In addition, the function of determining reusability described above may also be provided by the scanning unit 2.

Third Embodiment

When acquisition of image data and erasure of an image are continuously performed, the user cannot check whether or not the image data is stored in the memory unit reliably. The third embodiment describes an example in which a sheet is scanned and then temporarily stored and after the image data of the sheet stored in the memory unit is checked by the user, the image data is erased by the erasing unit.

Figure 7:
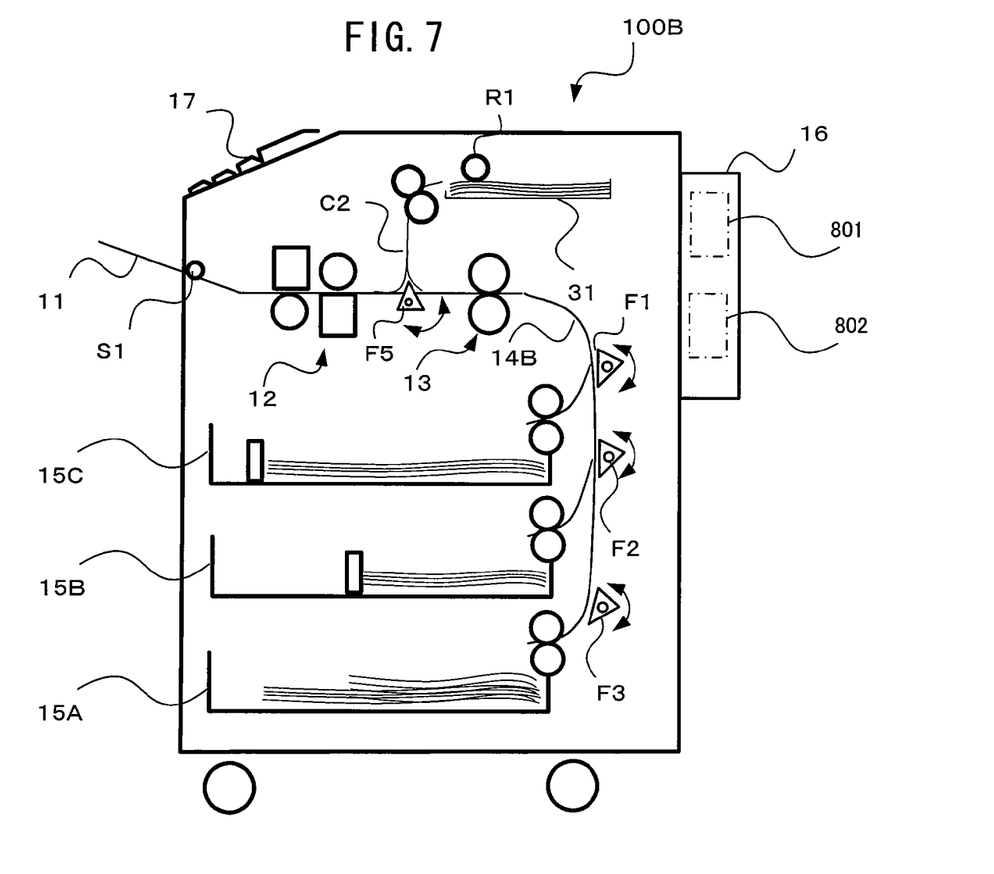
FIG. 7 is a diagram showing the configuration of an image erasing apparatus according to a third embodiment.

The configuration of the third embodiment is shown in FIG. 7. An image erasing apparatus 100B further includes a sheet storage tray 31 and a pickup roller R1 in addition to the configuration of the image erasing apparatus 100 according to the first embodiment, and a carrying unit 14B further includes a carriage pathway C2 to a flapper F5 and the sheet storage tray 31 in addition to the carrying unit 14.

The flapper F5 is provided between the scanner device 12 and the print erasing device 13 and guides the sheet scanned by the scanner device 12 in a direction of the sheet storage tray 31. The flapper F5 guides the sheet from the sheet storage tray 31 to the print erasing device 13 when an erasure instruction is received from the user, and guides the sheet from the sheet storage tray 31 in the direction of the sheet insertion opening 11 when an erasure cancel instruction is received from the user.

The sheet storage tray 31 is a tray that temporarily stores the sheet subjected to the scanning process. The pickup roller R1 picks up the sheet in the sheet storage tray 31.

Figure 8:
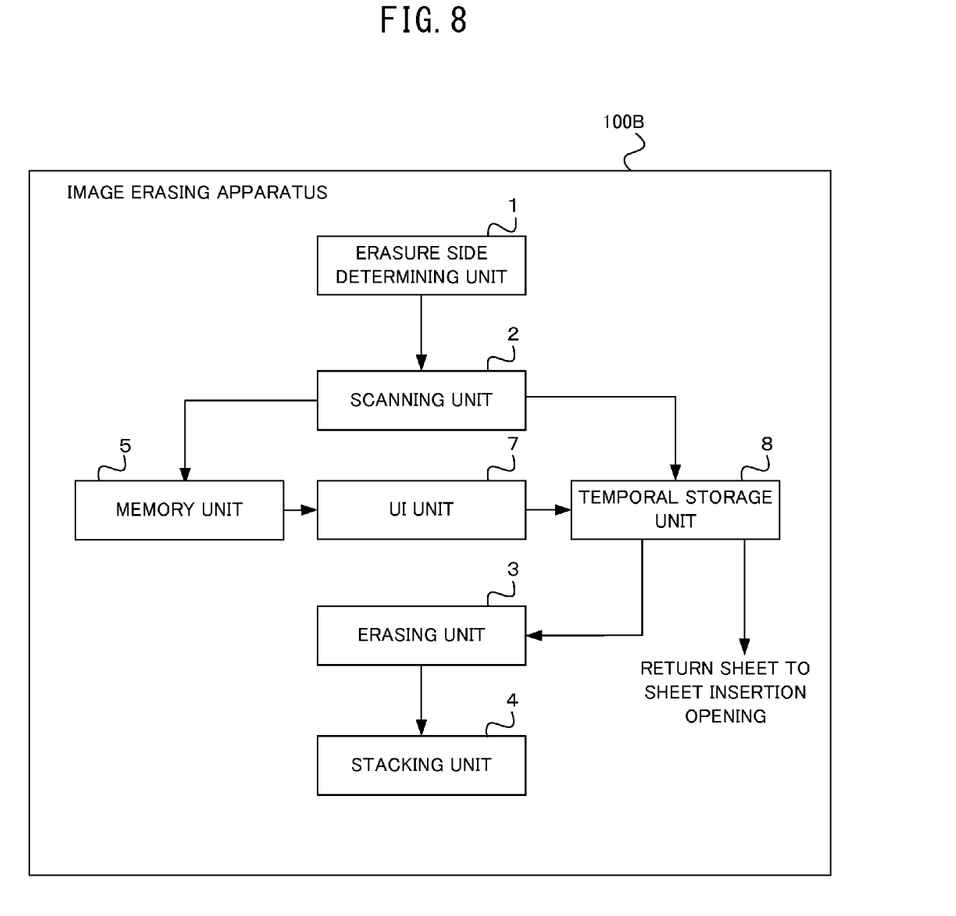
FIG. 8 is a block diagram of the image erasing apparatus according to the third embodiment.

Next, a block diagram of the image erasing apparatus 100B is shown in FIG. 8. The image erasing apparatus 100B further includes an UI (User Interface) unit 7 and a temporal storage unit 8 in addition to the image erasing apparatus 100 according to the first embodiment. Units other than the UI unit 7 and the temporal storage unit 8 are the same as those of the first embodiment, therefore detailed description thereof will be omitted.

The UI unit 7 displays the image data stored in the memory unit 5 on the control panel 17 and acquires the erasure instruction or the cancel instruction of the image formed on the sheet via the control panel 17 from the user.

The temporal storage unit 8 stores the sheet scanned by the scanning unit 2. When the erasure instruction is received from the user via the UI unit 7, the sheet stored in the temporal storage unit 8 is moved to a carriable position of the carrying unit 14B by the pickup roller R1, and the carrying unit 14B carries the sheet to the erasing unit 3. In addition, when the cancel instruction is received from the user via the UI unit 7, the sheet stored in the temporal storage unit 8 is moved to the carriable position of the carrying unit 14B by the pickup roller R1, and the carrying unit 14B carries the sheet to the sheet insertion opening 11.

Figure 9:
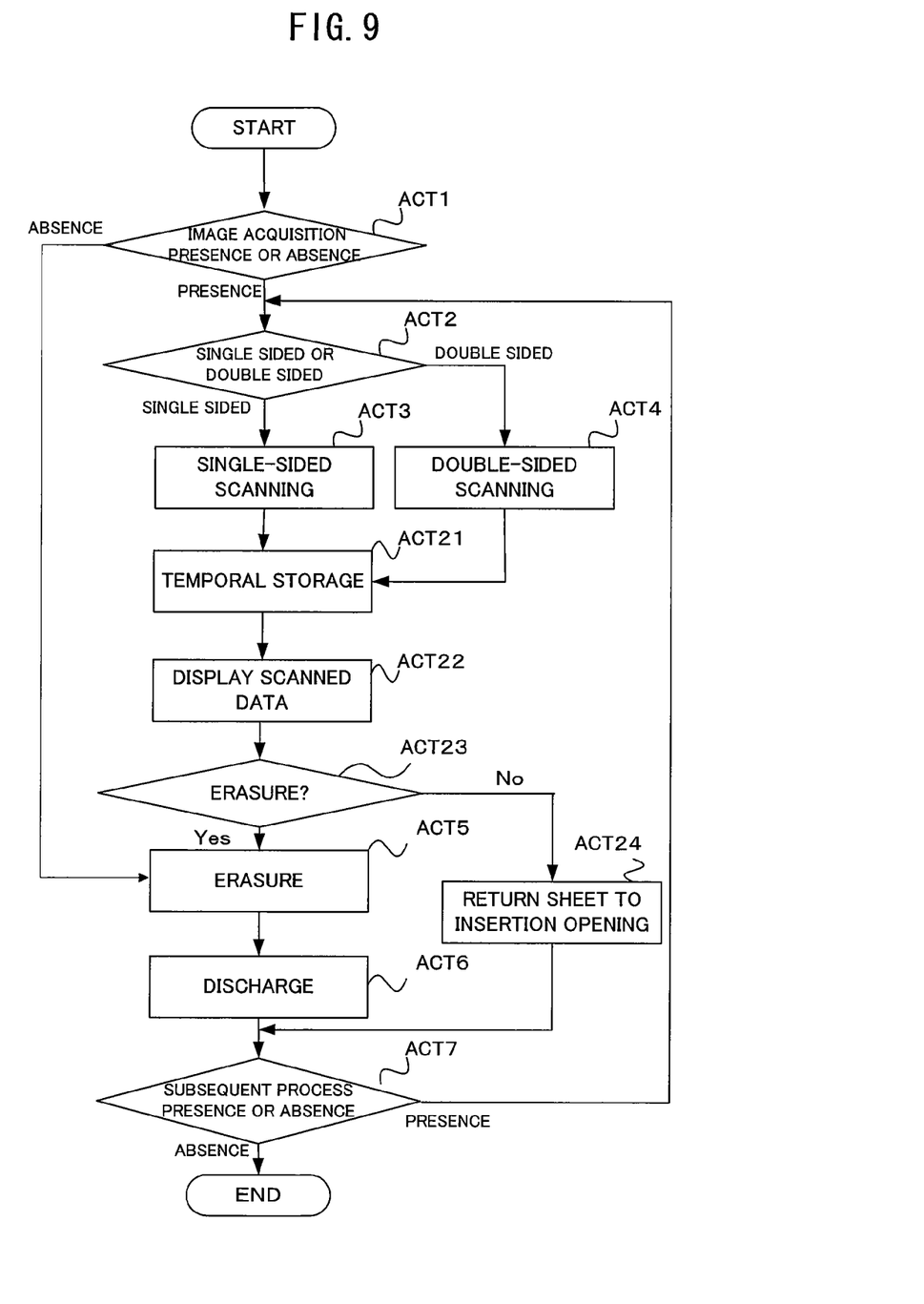
FIG. 9 is a diagram showing a flowchart of the image erasing apparatus according to the third embodiment.

Next, an operation example of the image erasing apparatus 100B will be described with reference to FIG. 9. In addition, like reference numerals the same as those of FIG. 3 denote like elements the same as those of the first embodiment, therefore detailed description will be omitted.

After either of single-sided scanning and double-sided scanning is performed by the scanning unit 2 (ACT 3 and ACT 4), the temporal storage unit 8 temporarily stores the sheet (ACT 21). Here, the flapper F5 is controlled by the control device 16 so as to be in a direction to guide the sheet to the sheet storage tray 31.

The UI unit 7 displays the image data that is currently scanned and stored in the memory unit 5 (ACT 22). The UI unit 7 acquires the erasure instruction or the cancel instruction from the user. When the acquired instruction is the erasure instruction (ACT 23, Yes), the temporal storage unit 8 discharges the stored sheet by rotating the pickup roller R1. The carrying unit 14B carries the discharged sheet to the print erasing apparatus 13. The erasing unit 3 erases the image formed on the sheet (ACT 5).

On the other hand, when the acquired information is the cancel instruction (ACT 23, No), the temporal storage unit 8 discharges the stored sheet by rotating the pickup roller R1. The carrying unit 14B carries the discharged sheet in the direction of the scanner device 12 so as to be carried to the sheet insertion opening 11 as it is.

In addition, when a plurality of sheets are collectively subjected to the erasing process, there may be a case where the user wants to check only whether or not image data is stored in the memory unit 5 rather than check precision of the stored image data. Here, when all of the sheets are displayed on the UI unit 7 and the user performs the erasure instruction on the sheets, the operation becomes complex. Therefore, in the third embodiment, when the plurality of sheets are processed collectively, the UI unit 7 displays the image data only of an initial single sheet. When the erasure instruction for the initial single sheet is received by the UI unit 7, the carrying unit 14B carries all of the sheets stored in the temporal storage unit 8 to the erasing unit 3. In addition, all of the image data may also be displayed.

As described above in detail, according to the technique described through the specification, the image formed on the sheet is converted into the electronic data before erasure and is saved in the memory unit, so that the information can be provided when the erased information is needed.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the sprit of the inventions. The accompanying claims and their equivalents are intended to cover such forms or modifications as would fall within the scope and spirit of the inventions.

What is claimed is:

1. An image erasing apparatus comprising:
   a scanning unit that converts an image formed on a sheet into first image data;
   a memory unit that stores the first image data;
   an erasing unit that erases the image formed on the sheet;
   a stack unit that comprises a plurality of cassettes that holds the sheet subjected to the image erasure by the erasing unit;
   a return conveyance unit that conveys the sheet processed by the erasing unit to the scanning unit again;
   a reuse determining unit that determines, based on second image data of the sheet generated by the scanning unit after the sheet has been conveyed to the scanning unit again by the return conveyance unit, whether or not there is a residual image on the sheet subjected to the image erasure by the erasing unit; and
   a conveyance unit that conveys the sheet first to the scanning unit and then to the erasing unit, the conveyance unit also conveying a sheet determined to have the residual image to a first of the plurality of cassettes and conveying a sheet determined to not have the residual image to a second of the plurality of cassettes.

2. The apparatus according to claim 1, further comprising an image side determining unit that determines which side of the sheet the image is formed.

3. The apparatus according to claim 1, wherein the conveyance unit conveys the sheet so that the sheet subjected to the image erasure are held by different cassettes depending on the sheet size.

4. The apparatus according to claim 1, wherein the scanning unit scans both a front side and a rear side of the sheet.

5. The apparatus according to claim 1, wherein the conveyance unit comprises a first conveying path that conveys the sheet first to the scanning unit, second to the erasing unit, and then to the stack unit, and the return conveyance unit comprises a second conveying path that branches from the first conveying path downstream from the erasing unit, and joins the first conveying path upstream of the scanning unit.

6. The apparatus according to claim 5, further comprising a flapper that is disposed downstream of the erasing unit, switches conveying destination of a sheet passed through the erasing unit to one of the stack unit and the second conveying path.

7. The apparatus according to claim 1, wherein the reuse determining unit determines whether the sheet scanned by the scanning unit is reusable, based on the second image data.

8. The apparatus according to claim 1, wherein the reuse determining unit determines whether the sheet scanned by the scanning unit is reusable, based on an edge detection process performed on the second image data.

9. An image erasing method comprising:
converting an image formed on a sheet into first image data by a scanning unit;
storing the first image data in a memory unit;
erasing the image formed on the sheet;
re-scanning the sheet subjected to the image erasure;
determining whether or not there is a residual image on the sheet subjected to the image erasure based on second image data generated from the re-scanning; and
conveying a sheet determined to have a residual image to a first cassette and conveying a sheet determined to not have a residual image to a second cassette.

10. The method according to claim 9, further comprising determining which side of the sheet the image is formed.

* * * * *